United States Patent [19]

Grassl, Sr.

[11] Patent Number: 4,462,632

[45] Date of Patent: Jul. 31, 1984

[54] FRAME FOR INTERPRETATION OF CLASSIC AUTOMOTIVE VEHICLE AND METHOD OF FABRICATING VEHICLE

[76] Inventor: Carl J. Grassl, Sr., 34 Wheaton Dr., Cheektowaga, N.Y. 14225

[21] Appl. No.: 352,108

[22] Filed: Feb. 25, 1982

[51] Int. Cl.³ .............................................. B62D 21/02
[52] U.S. Cl. ................................... 296/187; 296/198; 296/204; 296/205
[58] Field of Search .............................. 296/185–187, 296/191, 193–198, 203–205

[56] References Cited

U.S. PATENT DOCUMENTS

| | | | |
|---|---|---|---|
| 1,751,828 | 3/1930 | Marshall | 296/194 |
| 1,842,214 | 1/1932 | Sullivan | 296/195 |
| 2,627,426 | 2/1953 | Toncray et al. | 296/203 |
| 2,627,437 | 2/1953 | Toncray et al. | 296/203 |
| 2,669,462 | 2/1954 | Toncray et al. | 296/203 |
| 2,817,557 | 12/1957 | Reynolds | 296/194 |
| 2,827,327 | 3/1958 | Lindsay | 296/185 |
| 2,856,226 | 10/1958 | Purdy | 296/204 |
| 4,318,551 | 3/1982 | Shay et al. | 296/204 |
| 4,369,559 | 1/1983 | Phillips | 296/185 |

*Primary Examiner*—Robert R. Song
*Assistant Examiner*—Dennis H. Pedder
*Attorney, Agent, or Firm*—Joseph P. Gastel

[57] ABSTRACT

An automotive vehicle frame including a main frame consisting of a pair of elongated frame members extending longitudinally of the vehicle, outrigger frame members secured to the main frame members and extending laterally outwardly thereof, a fiberglass passenger compartment pan secured relative to the frame members and positioned in predetermined relationship thereto, and fenders, a cowling, a rear deck, a firewall, and a rear passenger compartment wall secured relative to the passenger compartment pan and to the frame members. A method of fabricating an interpretation of a classic automotive vehicle including the steps of providing a vehicle frame for mounting axles of a width different from the width of the original axles of the classic automotive vehicle, forming a modified body which resembles the body of the classic automotive vehicle and which is of a width different from the width of the body of the classic automotive vehicle by changing its width along its longitudinal centerline to fit the vehicle frame, and mounting the modified body on the vehicle frame. A hinge construction for an automotive door including a first pair of vertically spaced brackets secured to the frame of an automotive vehicle, a post pivotally mounted between the first pair of vertically spaced brackets, a second pair of vertically spaced brackets secured to the post, and an automotive door secured to the second pair of vertically spaced brackets.

14 Claims, 32 Drawing Figures

FRAME FOR INTERPRETATION OF CLASSIC AUTOMOTIVE VEHICLE AND METHOD OF FABRICATING VEHICLE

BACKGROUND OF THE INVENTION

The present invention relates to an improved frame for an interpretation of a classic automobile and to an improved method for fabricating the body thereof.

By way of background, in the past an interpretation of a classic automobile was fabricated by automobile buffs by assembling molded fiberglass body parts on the frame of an existing automotive vehicle, such as a Volkswagon. However, the frame of the standard vehicle is made in such a manner that it is extremely difficult to secure fiberglass bodies thereto and to mount the various parts of such bodies in proper relationship to the frame and to each other in a simple and structurally sound manner. It is with overcoming the foregoing deficiencies that the present invention is concerned.

SUMMARY OF THE INVENTION

It is one important object of the present invention to provide an automotive frame onto which interpretations of bodies of classic automotive vehicles can be assembled in an extremely simple and expedient manner by personnel who purchase the frame and the body members in kit form.

Another object of the present invention is to provide an improved method of fabricating an interpretation of a classic vehicle by altering the body style in such a manner that the body still bears a great likeness to the classic vehicle which is being interpreted, but which differs in dimensions from the classic vehicle.

A further object of the present invention is to provide an improved automotive door hinge construction in which the portion of the door adjacent the front fender swings outwardly and away from the adjacent portion of the front fender when the door is opened. Other objects and attendant advantages of the present invention will readily be perceived hereafter.

The present invention relates to an automotive vehicle frame comprising main frame means extending in a direction longitudinally of said automotive vehicle, and outrigger frame means mounted on said main frame means and extending outwardly from opposite sides of said main frame means for supporting the body of said automotive vehicle. The use of the outrigger frame means not only provides support for the vehicle body but is instrumental in locating the various portions of the body in an extremely expedient manner.

The present invention also relates to a method of fabricating an interpretation of a classic automotive vehicle comprising the steps of providing a vehicle frame for mounting axles of a width different from the width of the original axles of said classic automotive vehicle, forming a modified body of a width different than the width of the body of said classic automotive vehicle by changing its width to fit said vehicle frame, and mounting said modified body on said vehicle frame.

The present invention also relates to a hinge construction for an automotive door comprising a first pair of vertically spaced brackets, means securing said first pair of vertically spaced brackets to the frame of an automotive vehicle, a post pivotally mounted between said first pair of vertically spaced brackets, a second pair of vertically spaced brackets secured to said post, and means for securing said automotive door to said second pair of vertically spaced brackets. The various aspects of the present invention will be more fully understood when the following portions of the specification are read in conjunction with the accompanying drawings wherein:

BRIEF DESCRIPTION OF THE DRAWINGS

FIG. 8c is a fragmentary cross sectional view taken substantially along line 8c—8c of FIG. 8a;

FIG. 12a is a fragmentary cross sectional view taken substantially along line 12a—12a of FIG. 12 and showing various portions of the fender and associated supporting structure therefor;

FIG. 12b is a fragmentary cross sectional view taken substantially along line 12b—12b of FIG. 12a and showing the relationship between the rear portion of the fender and the outrigger portion of the frame;

FIG. 12d is a fragmentary cross sectional view taken substantially along line 12d—12d of FIG. 12a.

DESCRIPTION OF THE PREFERRED EMBODIMENTS

Figure 1:
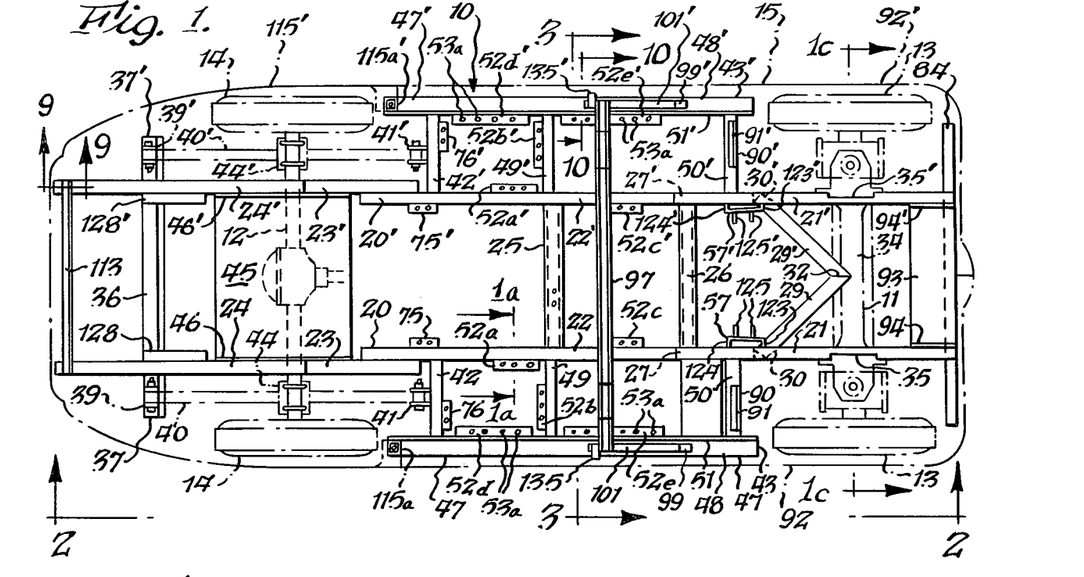
FIG. 1 is a plan view of the improved automotive vehicle frame with other relevant parts of the vehicle shown in phantom.

The vehicle frame 10 is fabricated in a size to mount a standard Ford Pinto front axle 11 and rear axle 12. These axles are used because they are readily available on the market, and can be used in the construction of the vehicle being interpreted, which in this instance is a 1952 Jaguar XK120. The vehicle frame and body are dimensioned around the standard Ford Pinto axles 11 and 12 which provide the desired spacing between the two front wheels 13 and two rear wheels 14 as shown in FIG. 1. This spacing is wider than the spacing between the wheels of the original vehicle. Therefore, the vehicle body 15 (FIGS. 1 and 12) is a widened version of the original body to conform to the widened lateral distance between the pair of front wheels and the pair of rear wheels. This lateral distance is two and one half inches larger than the lateral spacing between the wheels of the original vehicle being interpreted. Accordingly, the entire body 15 is fabricated two and one half inches wider, and this is achieved by building the body on forms which have been widened by two and one half inches along the longitudinal centerline of the vehicle. In other words, for example, the hood 16, rear deck 17, trunk lid 19 and cowl 107 (FIG. 12) are each two and one half inches wider than corresponding parts of the original vehicle, and this increased width has been obtained by widening these parts by two and one-half inches along their longitudinal centerlines, as depicted by numeral 18 in FIG. 12. All of the body parts, such as hood 16, rear deck 17 and trunk lid 19 and the fenders are formed of a fiberglass-resin compound on suitable forms, in the conventional manner.

In the following description a primed numeral will generally indicate structure which is the mirror image counterpart of that depicted by the unprimed numeral.

Figure 2:
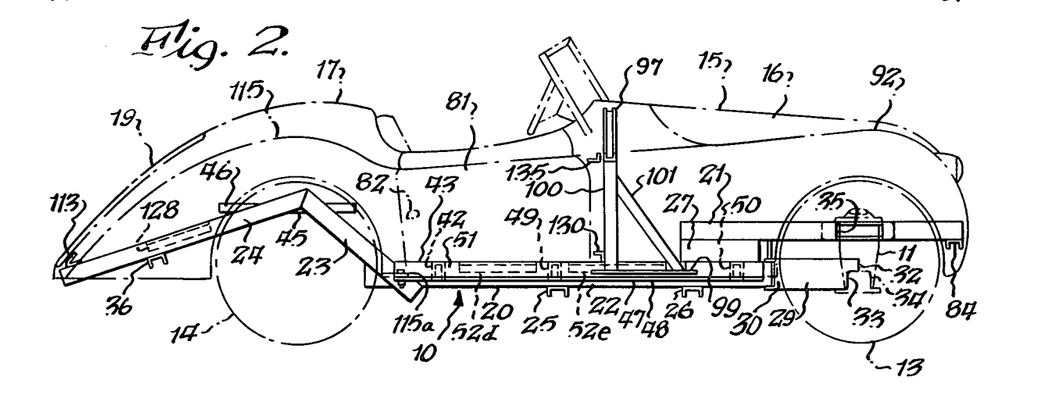
FIG. 2 is a side elevational view of the frame taken in the direction of arrows 2—2 of FIG. 1 and showing portions of the automotive vehicle associated with the frame in phantom.
Figure 3:
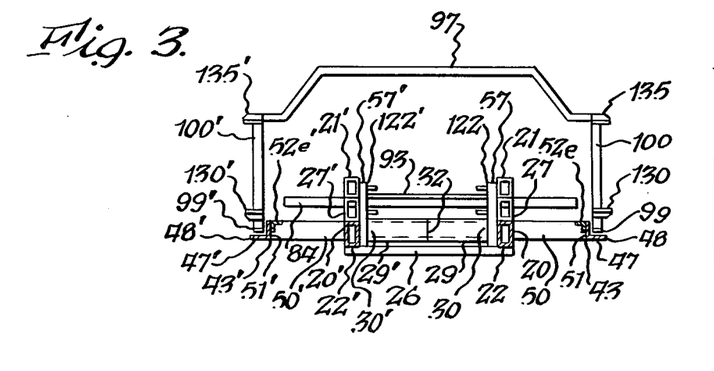
FIG. 3 is a cross sectional view taken substantially along line 3—3 of FIG. 1 and showing the inverted U-shaped frame member located on the central portion of the frame.

The main frame 10 includes a pair of mirror image counterpart longitudinal frame members 20 and 20', each of which include a front frame portion consisting of straight structural members in the form of tubular members 21 and 21', respectively, (FIGS. 1, 2 and 6), a central frame portion consisting of straight structural members in the form of tubular members 22 and 22', respectively, and a rear frame portion consisting of tubular members 23-24 and 23'-24', respectively. All of the foregoing tubular members are of hollow rectangular cross section. The opposite ends of channels 25 and 26 are welded to the undersides of frame members 22 and 22'. A pair of straight structural members in the form of tubular sections 27 and 27', which are of hollow rectangular cross section, are welded on top of the forward portions of frame members 22 and 22', respectively, and frame members 21 and 21' are welded to the tops of tubular members 27 and 27', respectively, (FIGS. 1, 2 and 3). As can be seen from FIGS. 2 and 3, the above described straight structural members 20', 27', 21', and 20, 27, 21 comprise box members with their longitudinal axes extending substantially parallel to each other. A pair of channels 29 and 29' (FIGS. 1, 2 and 3) have their rear ends 30 and 30', respectively, welded to the foremost ends of frame members 22 and 22', respectively, (FIG. 2) and are joined at their front ends by welding at seam 32 to form a horizontally disposed V-shaped cross frame member having a cutaway 33 at its apex for receiving the central portion 34 of axle 11 which is secured thereto by welding, central axle portion 34 being located between spaced longitudinal frame members 21 and 21' and being at substantially the same elevation as said central frame portion consisting of frame members 22 and 22'.

Front frame members 21 and 21' include cutaway portions 35 and 35' (FIGS. 1 and 1c), respectively, which receive portions 36 and 36' of axle 11 which is suitably secured thereto at this junction by welds. The forward ends of rear frame members 23 and 23' are welded to frame members 22 and 22', respectively, and the rear ends of rear frame members 23 and 23' are welded to frame members 24 and 24', respectively. A channel 36 is welded across frame members 24 and 24' (FIGS. 1 and 2) and the outer ends 37 and 37' of channel 36 extend outwardly beyond frame members 24 and 24', respectively, and mount shackles 39 and 39' for mounting the rear ends of leaf springs 40 and 40', respectively, the front ends of which are secured to shackles 41 and 41' mounted on rectangular tubular cross frame members 42 and 42' of the outrigger portions 43 and 43' of the frame. Rear axle 12 is secured to leaf springs 40 and 40' by means of conventional U-bolt assemblies 44 and 44', respectively. A plate 45 has the flanges 46 and 46' at its opposite ends welded across frame members 23-24 and 23'-24', respectively. A gas tank (not shown) for the vehicle is mounted on plate 45.

Figure 1A:
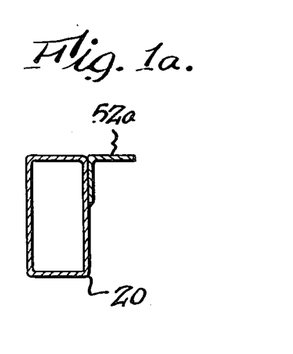
FIG. 1a is a cross sectional view taken substantially along line 1a—1a of FIG. 1.

In accordance with the present invention, the above-mentioned outriggers 43 and 43' are provided for the purpose of making the assmebly of the vehicle body onto the frame relatively easy and foolproof, considering that the vehicle body is assembled onto the frame 10 from a kit. Outriggers 43 and 43' are mirror images of each other and include outer angles 47 and 47', which are elongated members extending longitudinally of the main frame. Outrigger cross frame members 42, 49 and 50 in the form of hollow rectangular tubular sections have first ends welded to frame member 22 and their opposite ends welded to the vertical leg 51 of angle 47. Tubular outrigger cross frame members 42', 49' and 50' have first ends welded to longitudinal frame member 22' and their opposite ends welded to the vertical leg 51' of angle 47'. A plurality of angles 52a, 52b, 52c, 52d and 52e have their vertical legs welded to frame members 22, 49, 22, 47 and 47, respectively, as shown in FIGS. 1 and 1a. Angles 52a', 52b', 52c', 52d' and 52e' also have their vertical legs welded to frame members 22', 49', 22', 47' and 47', respectively, in the same manner. The horizontal legs of angles 52a, 52b, 52c, 52d and 52e and 52a', 52b', 52c', 52d' and 52e' are even with the tops of the frame members to which they are welded, as shown for example in FIG. 1a.

Figure 1B:
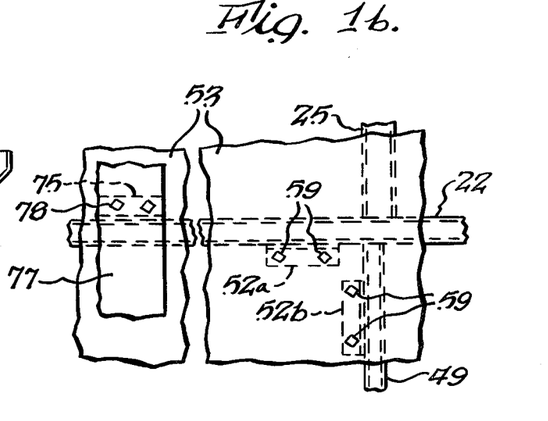
FIG. 1b is a fragmentary plan view showing the structure for bolting the passenger compartment pan to the frame.
Figure 1C:
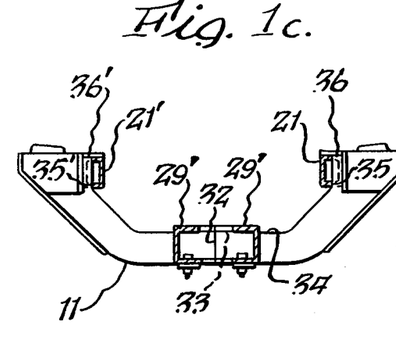
FIG. 1c is a cross sectional view taken substantially along line 1c—1c of FIG. 1 and showing the relationship between the frame and the axle.
Figures 6, 7, 8, 9, 10A, 11, 11A:
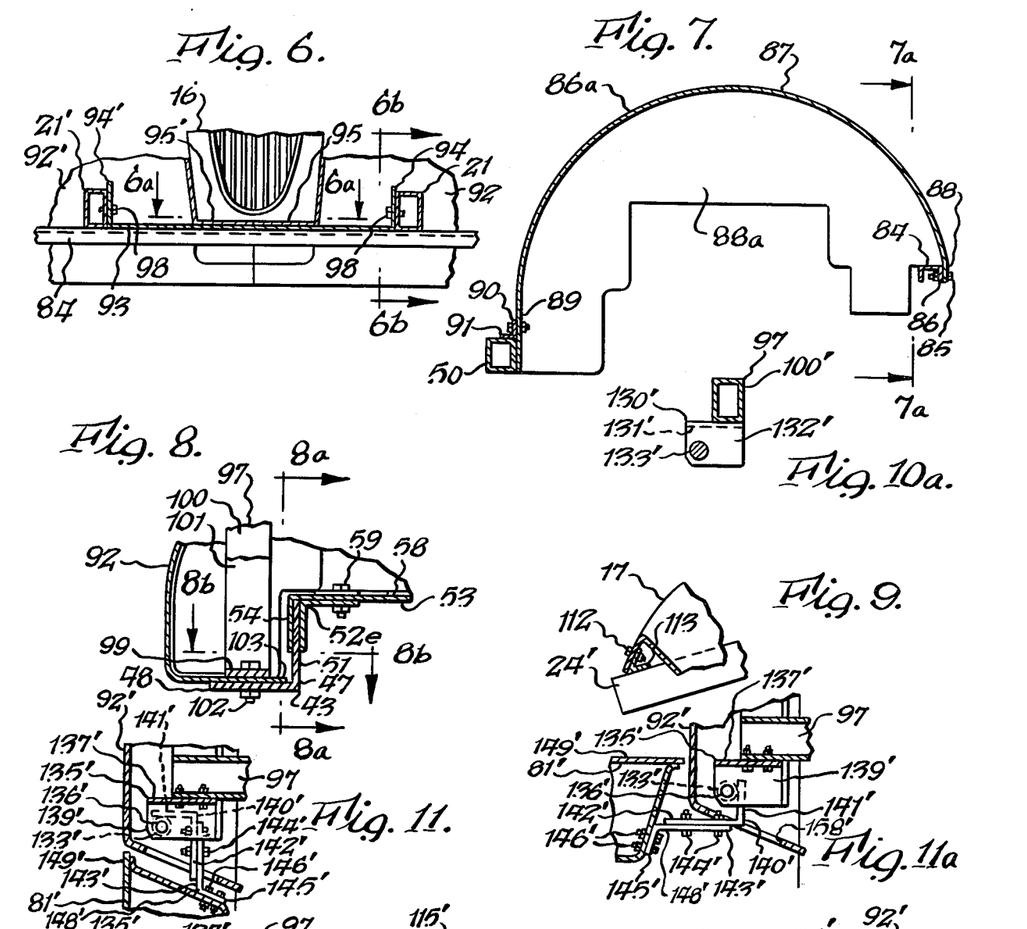
FIG. 6 is a fragmentary cross sectional view taken substantially along line 6—6 of FIG. 4 and showing the structure for mounting the front portions of the fenders on the frame.
FIG. 7 is a cross sectional view taken substantially along line 7—7 of FIG. 4 and showing the wheel well liners and related supporting structure.
FIG. 8 is a fragmentary cross sectional view taken substantially along line 8—8 of FIG. 4 and showing the lap joint between the outermost portion of the outrigger frame, the vehicle body, and the inverted U-shaped frame member.
FIG. 9 is a fragmentary cross sectional view taken substantially along line 9—9 of FIG. 1 and showing the structure for securing the rear portion of the rear deck to the frame.
FIG. 10a is a fragmentary cross sectional view taken substantially along line 10a—10a of FIG. 10.
FIG. 11 is a fragmentary cross sectional view taken substantially along line 11—11 of FIG. 10.
FIG. 11a is a view similar to FIG. 11 but showing the orientation of the parts when the door in an open condition.
Figure 8A:
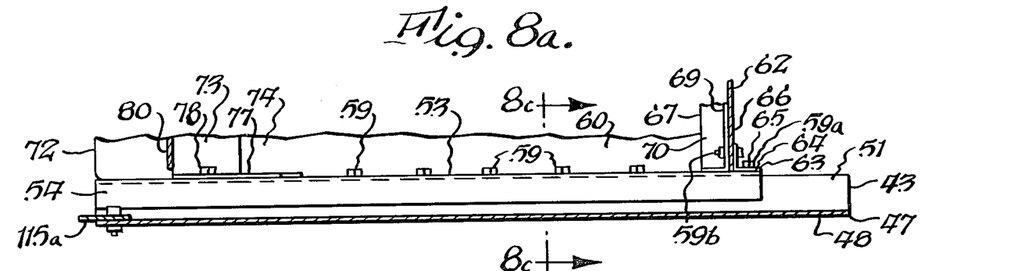
FIG. 8a is a fragmentary cross sectional view taken substantially along line 8a—8a of FIG. 8 and showing the structure for connecting the passenger compartment pan to the frame.
Figure 8B:
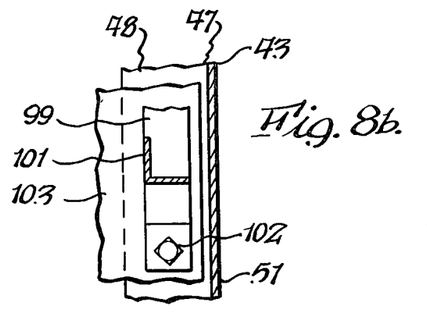
FIG. 8b is a fragmentary cross sectional view taken substantially along line 8b—8b of FIG. 8 and showing the relationship between the inverted U-shaped frame member and the outrigger on which it is mounted with the bottom of the fender therebetween.
Figure 8C:
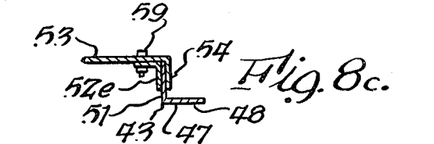

In order to assemble the vehicle body onto the frame 10, the passenger compartment pan 53 (FIG. 5) is mounted on frame 10 with the flange 54 and its mirror image counterpart 54' lying on the outside of vertical legs 51 and 51' of outrigger angles 47 and 47', respectively, to center pan 53 laterally. Marks 55 are provided on the floor of pan 53 and these marks are positioned during assembly exactly 33 inches from the rear flanges 124 and 124' of engine mounts 57 and 57'. After the pan 53 has thus been located in both a lateral and a fore and aft direction, a plurality of holes are drilled through pan 53 in alignment with predrilled holes, such as holes 53a in the horizontal legs of angles 52d and 52e and 52d' and 52e'. The horizontal legs essentially comprise tab members. Thereafter, a plurality of bolts 59 are used to secure the flanges as depicted in FIGS. 1b, 8 and 8a. In addition, holes are drilled through the floor sections 58 and 58' of pan 53 to coincide with predrilled holes (not numbered) in adjacent horizontal legs of angles 52a, 52b and 52c and 52a', 52b' and 52c' and bolts are utilized to secure pan 52 to the horizontal flanges of these angles. Floor pan 53 is fabricated from a fire-retardant resin-fiberglass composition and is molded to shape. It also includes the concave central section 60 (FIG. 5) which fits over the vehicle transmission and drive train, as can be understood. Box-like formations 61 and 61' are molded integrally with pan 53 and the vehicle seats (not shown) are suitably mounted on these members.

Figure 4:
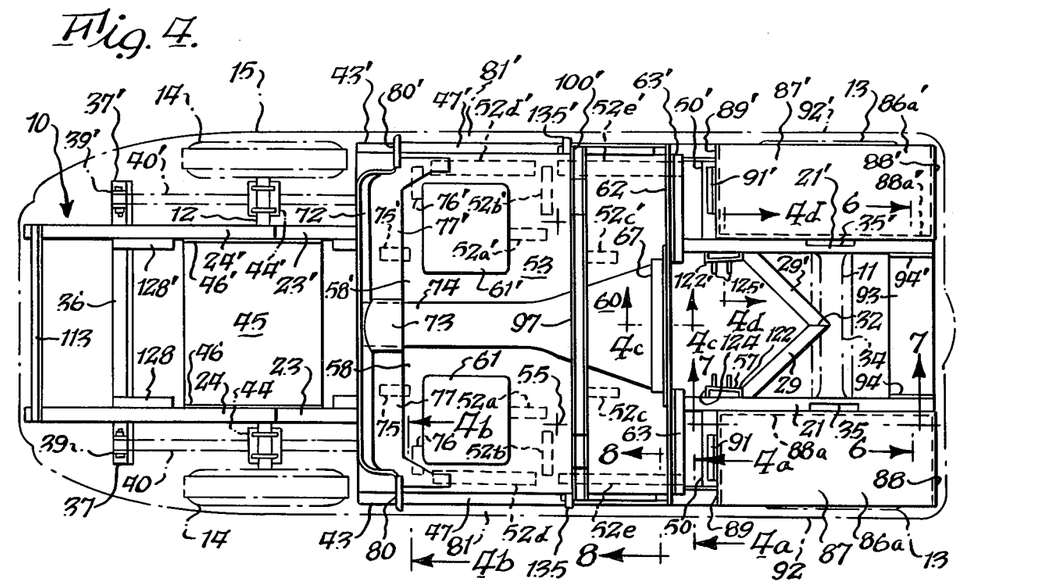
FIG. 4 is a plan view similar to FIG. 1 and showing the passenger compartment pan and its associated parts and the wheel well liners mounted on the frame.
Figure 4A:
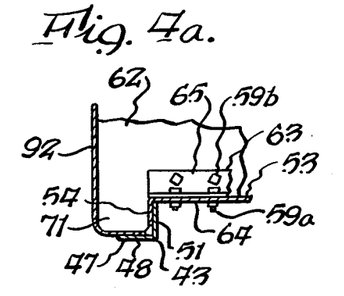
FIG. 4a is a fragmentary cross sectional view taken substantially along line 4a—4a of FIG. 4 and showing the structure for securing the fire wall to its adjacent parts.

After pan 53 has been assembled onto the frame in the above-described manner, firewall 62 (FIG. 5), which is also a molded fire-retardant fiberglass-resin piece, is installed. This is done by first bolting the horizontal legs of angles 63 and 63' to the leading edge portions 64 and 64' of pan 53 (FIGS. 4 and 4a) by means of bolts 59a. Thereafter, bolts 59b are secured through aligned holes in vertical legs 65 and 65' and portions 66 and 66' of firewall 62. The vertical portion of flashing 67 is then bolted to the edge portion 70 of the firewall by means of bolts 68 passing through aligned holes in the contiguous parts, and bolts 68a (FIG. 4c) are passed through aligned holes in horizontal curved flashing portion 70a and the edge portion 71a of pan portion 60. The lips 71 and 71' of firewall 62 are received in complementary relationship in angles 47 and 47' (FIG. 4a).

Figure 4B:
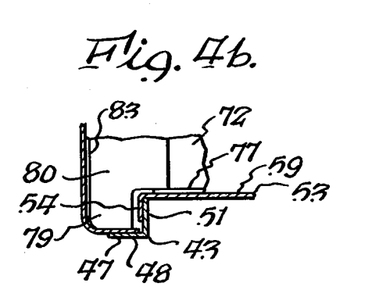
FIG. 4b is a fragmentary cross sectional view taken substantially along line 4b—4b of FIG. 4 and showing the relationship between the rear wall of the passenger compartment and its adjacent parts.

The rear wall 72 (FIG. 5) of the passenger compartment includes a central curved portion 73 which fits over portion 74 of concave portion 60 of pan 53 in complementary relationship. Rear wall 72 is molded of fiberglass-resin. The vertical legs of angles 75 and 76 (FIG. 1) are welded to frame members 22 and 42, respectively, with the upper horizontal legs of angles 75 and 76 even with the upper surfaces of the frame members. Angles 75' and 76' are secured to frame members 22' and 42' in a like manner. Flanges 77 and 77' are molded integrally with back wall 72. Bolts 78 are passed through drilled holes in flanges 77, 77', pan portions 58 and 58', and horizontal legs of angles 75 and 75' to secure rear wall 72 to the frame (FIG. 1b). Lips 79 and 79' fit into angles 43 and 43' (FIG. 4b). Side panels 80 and 80' which are formed integrally with rear wall 72 each mounts a keeper pin for coacting with the lock on the vehicle door, such as 81, the keeper pin being shown in phantom at 82 and 82'. Flanges 83 and 83' rigidize panels 80 and 80' and form the rear seal of the doors.

Figure 7A:
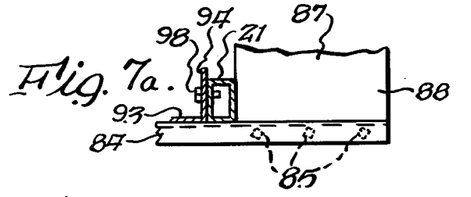
FIG. 7a is a fragmentary cross sectional view taken substantially along line 7a—7a of FIG. 7 and showing the structure for connecting the front of the wheel well liner to the frame.

A channel 84 (FIGS. 1 and 7a) is suitably secured, as by welding or bolts, to the undersides of frame members 21 and 21' and has outer portions which extend beyond them, said outer portions serving as supports for the front ends of wheel well liners 86a and 86a'. Fiberglass wheel well liners or fender liners 86a and 86a' (FIGS. 4 and 7) have curved planar portions 87 and 87'. The front end, such as 88 of curved portion 87, is secured to channel leg 86 by means of a plurality of bolts 85 (FIG. 7a). The opposite end 89 of curved portion 87 (FIG. 7) is bolted to the vertical leg 90 of angle 91 which has a horizontally disposed leg (not numbered) which is secured to outrigger cross member 50, vertical leg 90 extending upwardly from the horizontal leg and being secured to end 89 in lapped engagement. Wheel well liner 87' is secured in the same manner. Liners 86a and 86a' are fabricated from a fiberglass-resin compound. A vertical wall 88a (FIG. 7) is formed integrally with the curved planar portion 87 and is of the configuration shown in FIG. 7. The vertical wall 88a forms a wall of the engine compartment. The other liner 86a' is the mirror image of liner 86a.

Figure 6A:
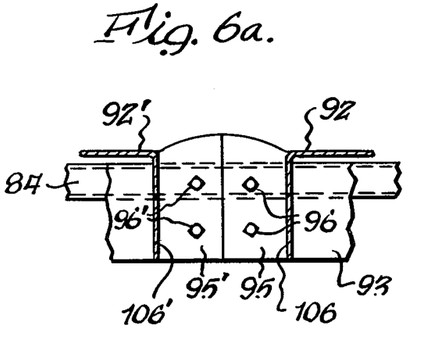
FIG. 6a is a fragmentary cross sectional view taken substantially along line 6a—6a of FIG. 6 and showing the connection between the front of the fenders and the frame.
Figure 6B:
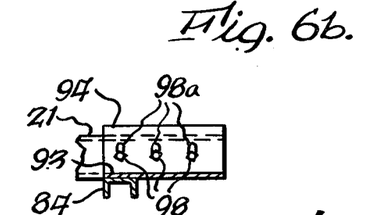
FIG. 6b is a fragmentary cross sectional view taken substantially along line 6b—6b of FIG. 6 and showing the structure for adjustably mounting the fender-supporting pan on the frame.
Figures 12A, 12B, 12D:
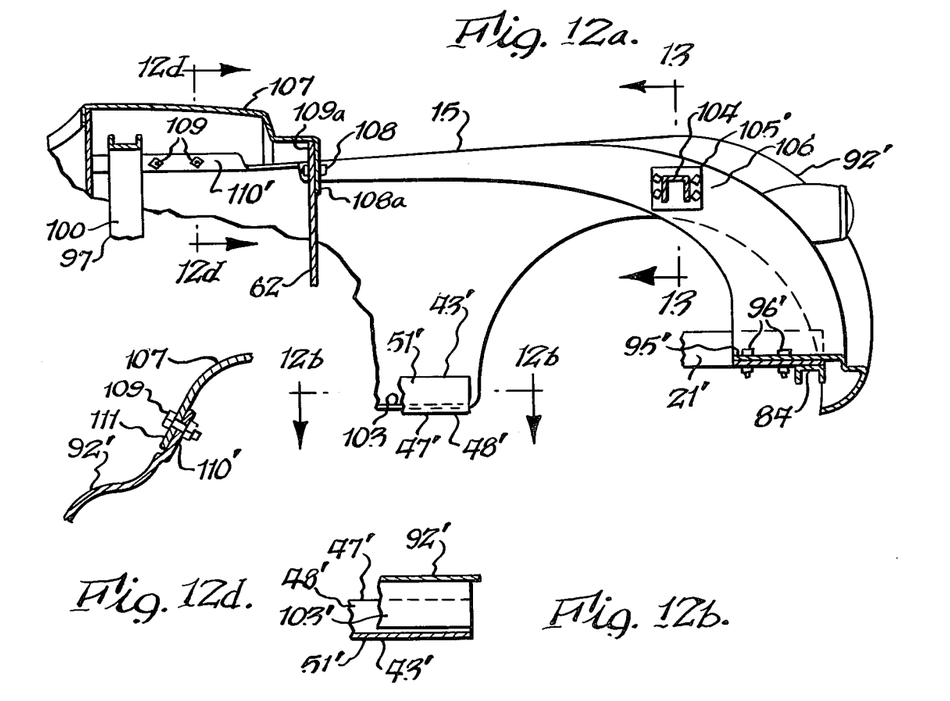

Fenders 92 and 92' are secured to the body in the following manner. A metal pan or cross member 93 (FIGS. 1, 6, 6a and 6b) is located forwardly of the outrigger frame members 43 and 43' has upstanding flanges 94 and 94' which are bolted to body frame members 21 and 21', respectively, by a plurality of bolts 98 extending through elongated vertical slots 98a so that the elevation of pan 93 may be adjusted. Pan or cross member 93 receives flanges 95 and 95' (FIG. 6a) of fenders 92 and 92', respectively, in abutting relationship, and flanges 95 and 95' are bolted to plate 93 by bolts 96 and 96'. Flanges 95 and 95' are oriented horizontally and extend toward each other and overlie cross member 93. Furthermore, as can be seen from FIGS. 6 and 12a, the flanges 95 and 95' are joined to the inner portions of the front fenders along lines (not numbered) which extend generally lengthwise of the outer portions of the fenders and which also extend generally lengthwise of the spaced longitudinal frame members 21 and 21' and which are located inwardly thereof. However, before the rear portions of fenders 92 and 92' are secured, inverted U-shaped cross frame member 97, which has downwardly extending legs 100 and 100' (FIG. 3), is positioned by placing elongated horizontal plates 99 and 99' at the bottoms of legs 100 and 100', respectively, on horizontal legs 48 and 48', respectively, of angles 47 and 47', respectively, of outrigger frame members 43 and 43', respectively. As can be seen from FIGS. 2, 3 and 8, horizontal plate 99 is welded to the bottom of tubular leg 100 and a cross brace 101, which is of angle cross section, is welded between leg 100 and plate 99. Cross brace 101' is the mirror image of cross brace 101 and it functions in the same manner. Horizontal plates 99 and 99' of cross frame member 97 are located on horizontal legs 48 and 48' of angles 47 and 47'. During the process of assembly, a plurality of spacers not shown are positioned therebetween. Thereafter, the spacers are removed and the horizontal flange 103 of fender 92, which is oriented horizontally and extends inwardly from the fender 92 toward the first spaced longitudinal frame members 22 and overlies the outrigger frame member flange 48, is slipped between plate 99 and horizontal flange 48 and a plurality of bolts 102 are passed through the three lapped members (FIG. 8) to effectively secure leg 100 to the horizontal leg 48 of angle 47 of outrigger member 43 with flange 103 therebetween. Thus, fender 92 is secured to plate 93 at its front end, as described above, and to horizontal leg 48 of angle 47 at its rear end. Fender 92' is secured in the same manner. The joint between the wheel well liner 86a and the fender is sealed by a suitable cement.

Figure 13:
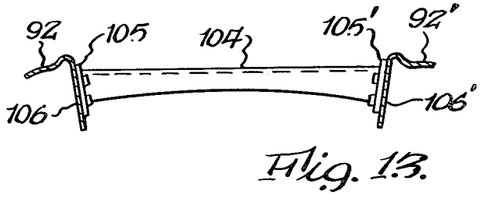
FIG. 13 is a fragmentary cross sectional view taken substantially along line 13—13 of FIG. 12a and showing the cross bar joining the front portions of the fenders.

A formed tubular fiberglass-resin member 104 (FIGS. 12a and 13) having flanges 105 and 105' at its opposite ends is placed between flanges 106 and 106' of the fenders and secured thereto with bolts. A cowling 107 (FIGS. 12 and 12a) is secured to firewall 62 by a plurality of bolts 108 which pass through flange 108a thereof and through the upper edge 109a of the firewall. It is also secured to fender 92' by a plurality of bolts 109 (FIGS. 12a and 12d) which pass through adjacent lapped flanges 110' and 111 of the fender 92' and cowling 107, respectively. The opposite side of cowling 107 is secured to fender 92 in a like manner.

Figures 4C, 5:
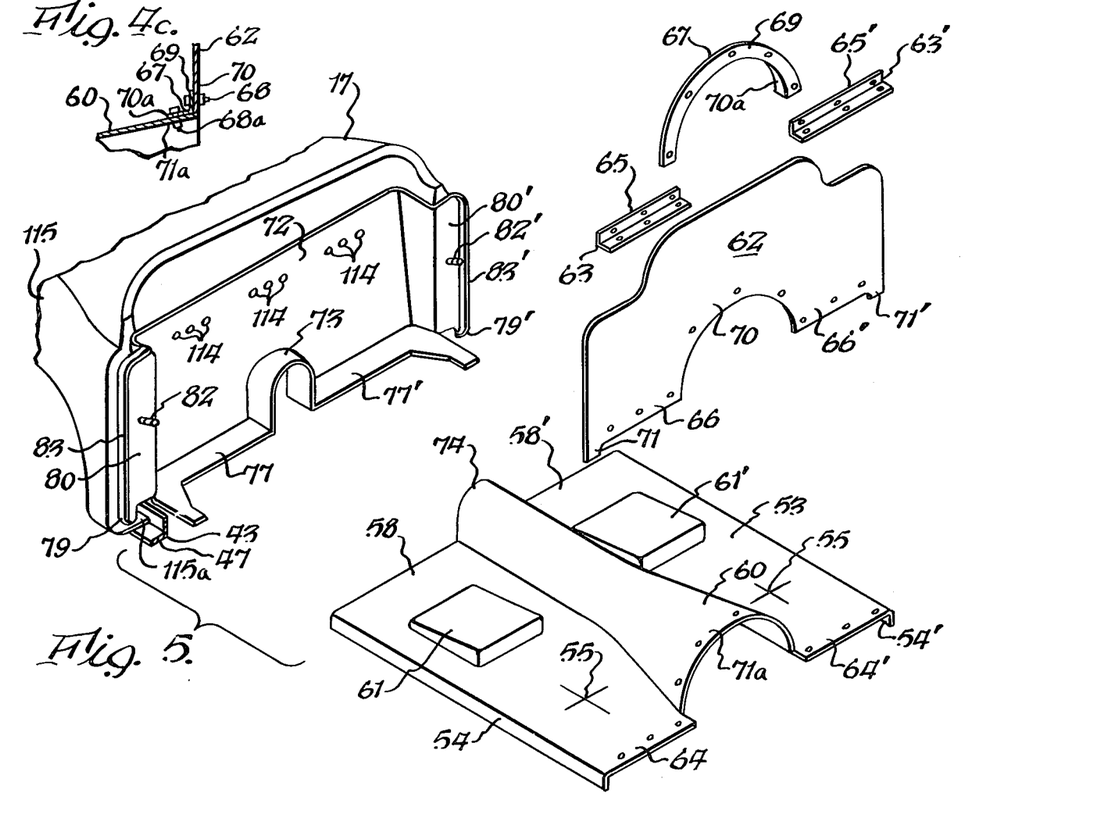
FIG. 4c is a fragmentary cross sectional view taken substantially along line 4c—4c of FIG. 4.
FIG. 5 is an exploded perspective view of the passenger compartment pan, the rear vertical wall of the passenger compartment and the firewall and its associated parts.

The rear deck 17 is secured by a plurality of bolts 112 to angle 113 at its rear end (FIG. 9) and by a plurality of bolts 114 to the top of rear wall 72 (FIG. 5). Rear fender 115' (FIG. 12c) is secured to rear deck 17 by bolts 116 passing through flanges 117' and 119' of rear deck 17 and fender 115', respectively. In addition, the front portion 115a of rear fender 115 (FIGS. 1 and 5) is bolted to outrigger angle 47. Rear fender 115' is secured in the same manner. The hood 16 and trunk lid 19 are attached to the cowling 107 and rear deck 17, respectively, by hinges (not shown) in the conventional manner. A trunk insert (not shown) is bolted to angles 128 and 128' which are welded to the frame as shown, and the trunk insert is also bolted to rear deck 17.

Figure 4D:
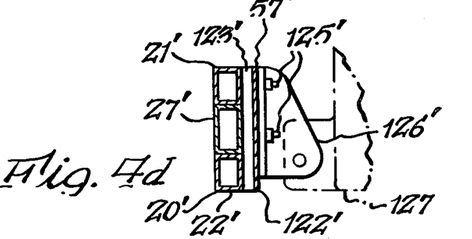
FIG. 4d is a fragmentary cross sectional view taken substantially along line 4d—4d of FIG. 4 and showing the engine mounts.

Engine mounting plates 122 and 122' of engine mounts 57 and 57', respectively, are provided for mounting the engine. Plate 122' (FIG. 4d) includes flanges 123' and 124' which are welded to frame members 22', 27' and 21' and bolts 125' (FIG. 4d) extend outwardly from plate 122' to mount engine mounting bracket 126' which mounts engine 127. Plate 122 is the mirror image of plate 122'.

All angles, such as 52a, 52b, 52c, 52d and 52e and 128 are predrilled, and during assembly the adjacent fiberglass-resin parts of the body have holes drilled therethrough in alignment with the predrilled holes to receive the bolts which hold the parts together.

Figures 10, 12, 12C:
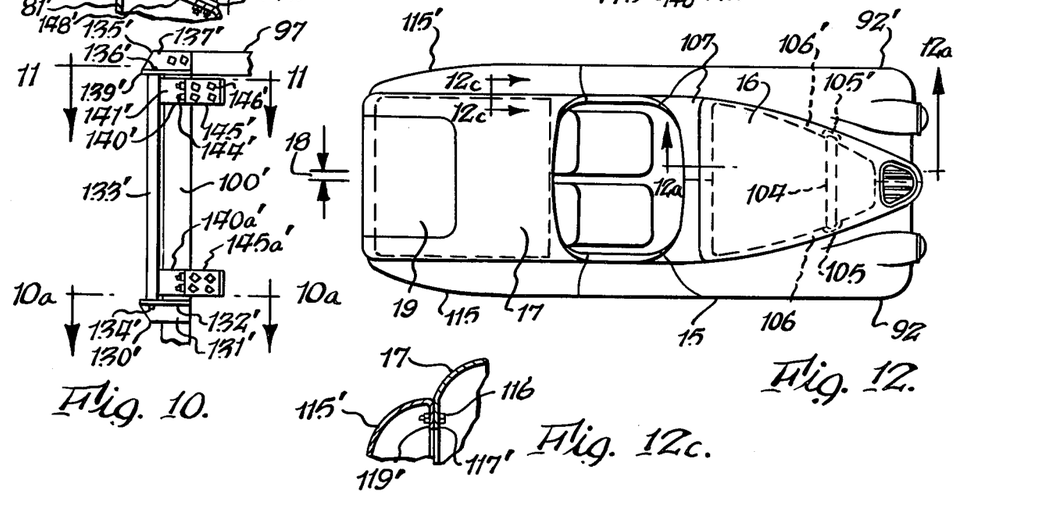
FIG. 10 is a fragmentary side elevational view taken in the direction of arrows 10—10 of FIG. 1 and showing the hinge mounting for the doors.
FIG. 12 is a plan view of the automobile body showing how the original vehicle parts have been widened to fit the frame.
FIG. 12c is a fragmentary cross sectional view taken substantially along line 12c—12c of FIG. 12.

Door 81', which is the counterpart of door 81 of FIG. 2, is mounted as shown in FIGS. 10 and 11. A bracket 130' (FIGS. 10 and 10a), which is in the form of an angle, has its vertical leg 131' welded to tubular post 100' of inverted U-frame member 97. The horizontal leg 132' pivotally receives the reduced end portion 134' of post 133'. A bracket 135', which is the mirror image of bracket 130', has an aperture therein which pivotally receives the reduced end portion 136' of post 133'. The vertical leg 137' of bracket 135' is bolted to post 100' after the reduced end portion 136' is pivotally received in the aperture in horizontal leg 139'. Thus, post 133' can pivot about its longitudinal axis. An upper right-angle bracket 140' has its leg 141' welded to post 133'. Leg 142' receives leg 143' of door bracket 148' in lapped relationship and they are secured to each other by bolts 144'. Door 81' is secured to leg 145' of bracket 143' by bolts 146'. The brackets 140' and 143' extend through a suitable opening 158' in fender 92'. Angle bracket 140a' is identical to bracket 140' and is welded to post 133' at a lower elevation. Bracket 143a' is identical to bracket 143'. Brackets 140a' and 145' extend through a suitable opening in fender 92' in the same manner as shown for the upper bracket. Legs 142' and 145' comprise the central portion of a composite bracket consisting of brackets 140' and 143'. It can be seen from FIG. 11a that the above described hinge structure permits the outer skin 149' of door 81' to swing away from fender 92' when the door is opened.

It can thus be seen that the improved vehicle frame and body construction is manifestly capable of achieving the above enumerated objects, and while preferred embodiments of the present invention have been disclosed, it is to be understood that the present invention is not limited thereto but may be otherwise embodied within the scope of the following claims.

What is claimed is:

1. An automotive vehicle frame construction comprising a main frame extending in a direction longitudinally of said automotive vehicle and comprising first and second spaced longitudinal frame members, outrigger frame means mounted on said main frame means and extending outwardly thereof for supporting body members of said automotive vehicle, a cross member on said spaced longitudinal frame members located forwardly of said outrigger frame means, a pair of spaced front fenders having front portions and rear portions, first flanges on said front portions of said front fenders, said first flanges being oriented horizontally and extending toward each other and overlying said cross member, first bolt means securing said first flanges to said cross member, second flanges on said rear portions of said fenders, said second flanges being oriented horizontally and extending inwardly from said fenders toward said first and second spaced longitudinal frame members and overlying said outrigger frame means, second bolts extending through said second flanges and said outrigger frame means for securing said second flanges to said outrigger frame means, said cross member comprising a horizontal plate between said first and second spaced longitudinal frame members, said horizontal plate including vertical flanges at its opposite ends, a plurality of vertical slots in each of said vertical flanges, and third bolts extending through said vertical slots and said first and second spaced longitudinal frame members for adjustably mounting said horizontal plate on said main frame means.

2. An automotive vehicle frame construction comprising a main frame extending in a direction longitudinally of said automotive vehicle and comprising first and second spaced longitudinal frame members, outrigger frame means mounted on said main frame means and extending outwardly thereof for supporting body members of said automotive vehicle, a cross member on said spaced longitudinal frame members located forwardly of said outrigger frame means, a pair of spaced front fenders having front portions and rear portions, first flanges on said front portions of said front fenders, said first flanges being oriented horizontally and extending toward each other and overlying said cross member, first bolt means securing said first flanges to said cross member, second flanges on said rear portions of said fenders, said second flanges being oriented horizontally and extending inwardly from said fenders toward said first and second spaced longitudinal frame members and overlying said outrigger frame means, second bolts extending through said second flanges and said outrigger frame means for securing said second flanges to said outrigger frame means, an inverted U-shaped frame member having downwardly extending legs, horizontal plate means secured to the lower portions of said legs, said horizontal plate means overlying said second flanges, and said second bolts extending through said horizontal plate means and said second flanges and said outrigger frame means for securing said rear portions of said front fenders and said inverted U-shaped frame member and said outrigger frame means in assembled relationship.

3. An automotive vehicle frame construction as set forth in claim 2 wherein said outrigger frame means comprise elongated members having horizontal surfaces, said elongated members comprising the outermost portions of said outrigger frame means, and wherein said second flanges and said horizontal plate means are supported on said horizontal surfaces.

4. An automotive vehicle frame construction comprising a main frame extending in a direction longitudinally of said automotive vehicle and comprising first and second spaced longitudinal frame members, outrigger frame means mounted on said main frame means and extending outwardly thereof for supporting body members of said automotive vehicle, a cross member on said spaced longitudinal frame members located forwardly of said outrigger frame means, a pair of spaced front fenders having front portions and rear portions, first flanges on said front portions of said front fenders, said first flanges being oriented horizontally and extending toward each other and overlying said cross member, first bolt means securing said first flanges to said cross member, second flanges on said rear portions of said fenders, said second flanges being oriented horizontally and extending inwardly from said fenders toward said first and second spaced longitudinal frame members and overlying said outrigger frame means, second bolts extending through said second flanges and said outrigger frame means for securing said second flanges to said outrigger frame means, said main frame including a front end and rear end, first and second wheel liners each having a front end and a rear end and a central portion therebetween, first and second wheel liner support means secured to and extending outwardly from said first and second spaced longitudinal frame members at said front end for mounting said front ends of said wheel liners, said outrigger frame means including outrigger cross members, said outrigger cross members including first and second outrigger cross members located toward said front end, and third and fourth wheel well liner support means on said first and second outrigger cross members, said third and fourth wheel well liner support means comprising first and second angles each having a horizontally disposed leg secured to said first and second outrigger cross members and a vertical leg extending upwardly from the horizontal leg for lapped engagement with said rear ends of said wheel liners.

5. An automotive vehicle frame comprising main frame means including first and second spaced longitudinal frame members extending in a direction longitudinally of said automotive vehicle, outrigger frame means mounted on said main frame means and extending outwardly from opposite sides of said main frame means for supporting body members of said automotive vehicle, a front frame portion on said main frame means located forwardly of said outrigger frame means and a rear frame portion on said main frame means located rearwardly of said outrigger frame means, a plurality of cross members securing said first and second spaced longitudinal frame members to each other, a front vehicle axle having a central axle portion located between said first and second spaced longitudinal frame members, said main frame means also including a central frame portion between said front and rear frame portions, elevating frame means for elevating said front frame portion above said central frame portion, means on said front frame portion for securement to spaced portions of said front vehicle axle outwardly of said central axle portion, axle supporting cross frame means secured to and extending forwardly from said central frame portion and secured to said central axle portion of said front vehicle axle, said central frame portion comprising first straight structural members, and said front frame portion comprising second straight structural members, and said elevating frame means comprising third straight structural members, and means for securing said third straight structural members on top of said first straight structural members and for securing said second straight structural members on top of said third straight structural members to thereby elevate said front frame portion above said central frame portion.

6. An automotive vehicle frame construction as set forth in claim 5 wherein said first and second and third straight structural members comprise box members with their longitudinal axes extending substantially parallel to each other.

7. An automotive vehicle frame construction as set forth in claim 5 wherein said central axle portion and said central frame portion are at substantially the same elevation, and wherein said axle supporting cross frame means comprises a horizontally disposed substantially V-shaped member having a narrow end and a wide end, said narrow end being secured to said central portion of said axle and said wide end being secured to said longitudinal frame members at said central frame portion, and said V-shaped member being at substantially the same elevation as said central axle portion and said central frame portion.

8. An automotive vehicle frame construction comprising main frame means including first and second spaced longitudinal frame members extending in a direction longitudinally of said automotive vehicle, outrigger frame means mounted on said main frame means and extending outwardly from opposite sides of said main frame means for supporting body members of said automotive vehicle, a plurality of cross members securing said first and second spaced longitudinal frame members to each other, said outrigger frame means comprising first and second elongated outrigger members located outwardly of said first and second spaced longitudinal frame members, respectively, and a plurality of outrigger cross members securing said first and second elongated outrigger members to said first and second spaced longitudinal frame members, respectively, a passenger compartment pan mounted on said main frame means and on said outrigger frame means, said first and second elongated outrigger members comprising angles having horizontal legs and vertical legs with their vertical legs being in spaced back-to-back relationship and their horizontal legs extending outwardly in opposite directions from their vertical legs, and said passenger compartment pan including downwardly extending flanges lying outwardly of and in contiguous relationship with said vertical legs for positioning said passenger compartment pan laterally of said elongated outrigger members.

9. An automotive vehicle frame construction as set forth in claim 8 including a plurality of tab members on said main frame means, and means securing said passenger compartment pan to said tab members.

10. An automotive vehicle frame construction as set forth in claim 9 wherein said tab members comprise angle members having vertical legs and horizontal legs, means securing said vertical legs to said main frame members with said horizontal legs at substantially the same elevation as the tops of said main frame members, and means securing said passenger compartment pan to said horizontal legs.

11. An automotive vehicle frame construction as set forth in claim 10 including second angle members having second horizontal legs and second vertical legs, means securing said second vertical legs to said outrigger frame means with said second horizontal legs at substantially the same elevation as the top of said outrigger frame means, and means seucring said passenger compartment pan to said second horizontal legs.

12. An automotive vehicle frame construction as set forth in claim 8 including an inverted U-shaped frame having first and second legs, and means securing said first and second legs on said horizontal legs of said first and second elongated outrigger members, respectively, outwardly of said downwardly extending flanges of said passenger compartment pan.

13. An automotive vehicle frame construction as set forth in claim 12 including first and second cross braces secured to said first and second legs, respectively, first and second plates, said first and second legs and said first and second cross braces having lower portions secured to said first and second plates, said first and second plates being supported on said horizontal legs of said first and second elongated outrigger members, respectively, and wherein said means securing said first and second legs on said horizontal legs comprise bolts extending through said first and second plates and said horizontal legs of said first and second elongated outrigger members.

14. An automotive vehicle frame construction as set forth in claim 13 including first and second fenders on said main frame means, front and rear portions on said first and second fenders, horizontal flanges on said rear portions of said first and second fenders, said horizontal flanges extending inwardly toward said main frame means and being located between said horizontal legs of said first and second elongated outrigger members and said first and second plates.

* * * * *

UNITED STATES PATENT AND TRADEMARK OFFICE
CERTIFICATE OF CORRECTION

PATENT NO. : 4,462,632
DATED : July 31, 1984
INVENTOR(S) : Carl J. Grassl, Sr.

It is certified that error appears in the above-identified patent and that said Letters Patent are hereby corrected as shown below:

Column 5, line 6, change "assmebly" to --assembly--;

line 49, change "52" to --53--.

Column 9, line 60 (claim 4), after "main frame" insert --means--.

Signed and Sealed this

Eighteenth Day of December 1984

[SEAL]

*Attest:*

*Attesting Officer*

GERALD J. MOSSINGHOFF

*Commissioner of Patents and Trademarks*